(No Model.)
G. PFANNKUCHE.
ELECTRIC CURRENT INDICATOR.
No. 414,076. Patented Oct. 29, 1889.
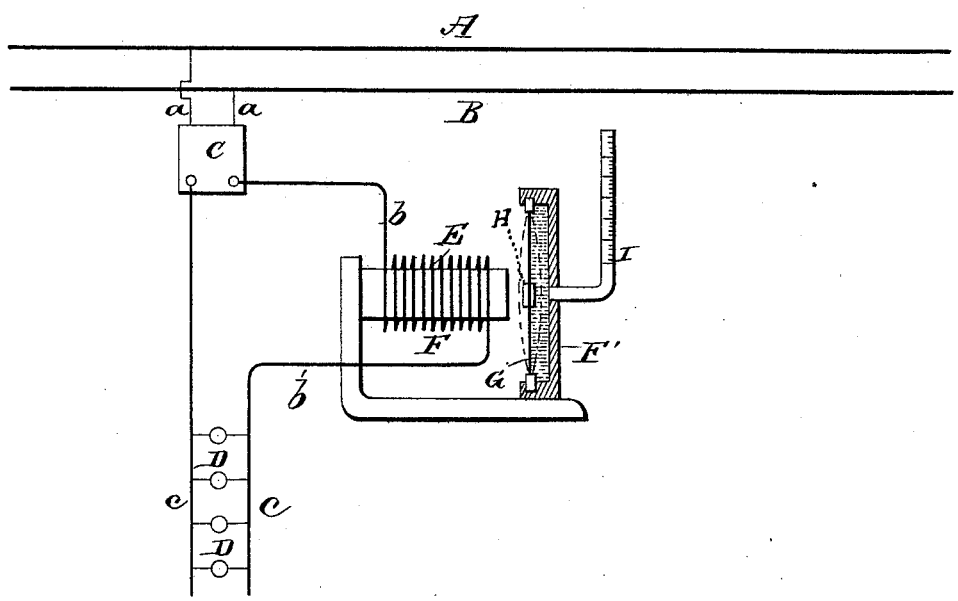
Witnesses
E. Nottingham
G. F. Downing
Inventor
Gustav Pfannkuche
By his Attorney
H. A. Symons

UNITED STATES PATENT OFFICE.

GUSTAV PFANNKUCHE, OF CLEVELAND, OHIO.

ELECTRIC-CURRENT INDICATOR.

SPECIFICATION forming part of Letters Patent No. 414,076, dated October 29, 1889.

Application filed July 30, 1889. Serial No. 319,157. (No model.)

*To all whom it may concern:*

Be it known that I, GUSTAV PFANNKUCHE, of Cleveland, in the county of Cuyahoga and State of Ohio, have invented certain new and useful Improvements in Ammeters and Voltmeters; and I do hereby declare the following to be a full, clear, and exact description of the invention, such as will enable others skilled in the art to which it appertains to make and use the same.

My invention relates to an improvement in ammeters and voltmeters, the object being to provide an instrument which shall be extremely simple in its construction and reliable and sensitive in its operation in indicating either the voltage or amprage of an alternating, pulsating, or intermitting current, according as the instrument may be constructed for serving either of the purposes specified.

With these ends in view the invention consists in the combination, with a magnet the coil of which is included in the circuit of the current to be indicated, or in a shunt from said circuit, of a liquid-receptacle and indicating-tube arranged vertically and connected with the liquid-receptacle, and a diaphragm secured in a vertical position, whereby it is adapted to be vibrated laterally by the magnet and force the liquid into the indicating-tube.

The accompanying drawing is a diagrammatic view of one embodiment of the invention.

A B represent the main conductors of an alternating-current system of electric distribution.

C is a converter of any preferred type and construction, the primary coil of which is included in the circuit $a\ a$ and its secondary coil in the circuit $b\ b'$, the latter having incandescent lamps, motors, or other translating devices D included in its multiple-arc branches $c\ c$.

E is a permanent magnet, which is encircled by a coil F, which forms part of the circuit $b\ b'$ and is of coarse wire if the instrument is to be used as an ammeter, or of fine wire if it is to be used as a voltmeter. Instead of including the instrument in the circuit $b\ b'$, it may be placed in a derived circuit therefrom.

F is a casing or receptacle, which is inclosed by a diaphragm G, the edges of the latter being tightly secured to the casing, so as to form a liquid-tight joint therewith. To the diaphragm is fastened a soft-iron armature H, which is located opposite and adjacent to the end of the magnet E, or the magnet E may consist of soft iron and the armature H may be a permanent magnet. A glass tube I communicates with the interior space of the casing and may be graduated, as indicated, or a graduated plate may be associated therewith. The casing is filled with alcohol, glycerine, or any other suitable liquid, and the height to which the liquid is forced in the tube serves to indicate the voltage or the amprage of the current according as the instrument may be constructed for serving either purpose.

When an alternating current is caused to flow through the coil inclosing the permanent magnet, it operates to rapidly strengthen and weaken the magnet and thereby cause it to rapidly attract and release the armature, and thus impart a vibrating movement to the diaphragm. The movement of the diaphragm is transmitted to the liquid in the casing and causes it to rise in the tube, the height to which it will rise being dependent on the amplitude and rapidity of the vibrations of the diaphragm. Owing to the fact that the action of the diaphragm is quite rapid, due to the rapid alternations or impulses of the current, the liquid will be maintained at a practical constant height in the tube so long as the current remains practically constant either in its strength or volume, because sufficient time will not elapse between the vibrations of the diaphragm during which the liquid can descend any appreciable distance. However, the height of the liquid column will vary, either with the varying voltage of the current to be indicated, (provided the instrument be constructed to serve as a voltmeter,) or with the varying amprage of the current to be indicated provided the instrument is constructed to serve as an ammeter. In either case the amplitude of vibrations of the diaphragm will vary with and correspond to the varying strength of the magnet E in the circuit through which flows the current to be measured, and hence the liquid in the indicating-tube will rise or fall with the rise and fall of the current in the line. It will therefore be evident that by the employment of this very simple instrument the voltage or amprage of the current may be accurately indicated at all times and under all conditions.

In order that the diaphragm may vibrate very rapidly in response to the rapid alternations of the current, and, further, that the amplitude of its vibrations may vary in accordance with the changes and fluctuations of the current, it is essential that it shall be so arranged that its own weight and the weight of the armature thereto attached shall be as nearly balanced as possible, and thus permit of such rapid action and also insure the prompt and delicate variations in the amplitude of vibration. To secure these results, the diaphragm is arranged vertically, so that its own weight and that of the armature connected therewith is as nearly balanced as possible, which allows of the greatest possible range of movement to the diaphragm on opposite sides of the plane in which it occupies when in a state of rest, and also reduces to the minimum that force required to overcome the momentum of the moving parts.

Having fully described my invention, what I claim as new, and desire to secure by Letters Patent, is—

In an electric-current indicator, the combination, with a magnet included in a circuit conveying an alternating, pulsating, or intermittent electric current, of a liquid-receptacle, an elastic diaphragm provided with an armature and connected with the liquid-receptacle, and an indicating-tube connected with the liquid-receptacle, said diaphragm and tube being arranged in a vertical position, substantially as set forth.

In testimony whereof I have signed this specification in the presence of two subscribing witnesses.

GUSTAV PFANNKUCHE.

Witnesses:
W. D. POST,
JNO. T. HUNTINGTON.